United States Patent [19]

Iwata

[11] Patent Number: 4,625,249
[45] Date of Patent: Nov. 25, 1986

[54] HEAD HOLDING MECHANISM OF MAGNETIC DISK DEVICE

[75] Inventor: Tetsuya Iwata, Yunotani, Japan

[73] Assignee: Alps Electric Co., Ltd., Japan

[21] Appl. No.: 804,589

[22] Filed: Nov. 29, 1985

Related U.S. Application Data

[63] Continuation of Ser. No. 349,972, Feb. 18, 1982, abandoned.

[30] Foreign Application Priority Data

Feb. 24, 1981 [JP] Japan ................................. 56-25750

[51] Int. Cl.$^4$ ...................... G11B 21/00; G11B 21/16
[52] U.S. Cl. ..................................... 360/104; 360/105
[58] Field of Search .............................. 360/102–106, 360/109; 369/170

[56] References Cited

U.S. PATENT DOCUMENTS

| 3,801,535 | 4/1974 | Joschko | 369/170 X |
| 4,216,505 | 8/1980 | Grant et al. | 360/104 |
| 4,306,260 | 12/1981 | Maeda et al. | 360/105 |
| 4,389,688 | 6/1983 | Higashiyama | 360/104 |

Primary Examiner—Robert L. Richardson
Attorney, Agent, or Firm—Guy W. Shoup

[57] ABSTRACT

In a head holding mechanism of a magnetic disk device wherein a pair of heads come into contact with both the surfaces of a magnetic disk and are respectively mounted through leaf springs, the leaf springs are embedded in respective vibration absorbers so that resonance of the leaf springs is prevented and the heads follow any warp of the magnetic disk well.

7 Claims, 10 Drawing Figures

HEAD HOLDING MECHANISM OF MAGNETIC DISK DEVICE

This is a continuation application from application Ser. No. 349,972 filed Feb. 18, 1982, and now abandonded.

BACKGROUND OF THE INVENTION

The present invention relates to a head holding mechanism in a magnetic disk device. More paritcularly, it relates to the head holding mechanism of a magnetic disk device in which a head is held by a gimbal formed by a leaf spring.

In recent years, devices which record information on a magnetic disk have come into wide use as the external storage devices of electronic computers and the like. In order to increase the amount of information that can be stored on the magnetic disk as well as the speed of recording, both sides of the magnetic disk are often used to record information. Further, the recording tracks of the magnetic disk have been narrowed to increase their density and the speeds of recording and reproduction have been raised. In the magnetic disk device utilizing both surfaces of the disk, there has been proposed a head holding mechanism in which a pair of heads are pressed against both surfaces of the disk.

FIGS. 1(a) and 1(b) show examples of a prior-art head holding mechanism of the magnetic disk device employing a flexible magnetic disk. FIG. 1(a) is a schematic view of the example in which a pair of heads are disposed movably on the sides of the magnetic disk. The paired first and second heads 1 and 2 are respectively attached to holding arms 4 and 4 through leaf springs or gimbals 3 and 3, and the medium 5 is hold between both the heads 1 and 2. Owing to the resiliency of the gimbals 3 and 3, both of the heads 1 and 2 are movable with respect to the disk surfaces. On the other hand, FIG. 1(b) is a schematic view of the example in which only one of the heads is made movable. The first head 1 is attached directly to a carriage 6, and is stationary in the direction of the surface of the disk 5. In contrast, the second head 2 is mounted on the holding arm 4 through the gimbal 3 and is therefore movable in the direction of the surface of the disk 5.

The features of the head holding mechanisms of these types are basically different as stated below. In the type in which the pair of heads on both sides of the disk ar movable, the first and second heads 1 and 2 thermseleves follow any warp and/or curvature of the disk 5, whereas in the type in which the head on only one side of the disk is movable, any warp and/or curvature of the disk 5 results in the disk being forcibly pressed against the stationary first head by the spring pressure of the second head 2.

In the first type in which the pair of heads on both sides of the disk are movable, the head load pressure is very low and is approximately 7 gr., and the heads may follow may curvature in the disk. On the other hand, in the second type in which one of the heads is stationary, the head load pressure may be as high as 14 gr.-20 gr. This is because the contact between the disk 5 and the stationary head 1 is ensured by the load pressure of the movable second head 2. Therefore, the second type has the problems that the disk 5 is prone to damage, and that the disk 5 is prone to float above the stationary first head 1.

Next, the rise characteristic of the head will be described. In the first type in which the pair of heads on both sides. of the disk are movable, the first and second heads 1 and 2 are held by the pliable gimbals 3 and 3, and hence, parasitic resonances are liable to occur. This leads to the problem that the period of time in which the output of the head is stabilized is long. On the other hand, the second type in which the heads on one side of the disk is stationary has the advantages that resonance is substantially reduced and vibrations decay quickly owing to the great load pressure. In additiion, the first type has the disadvantage that, since the gimbals are pliable, the operability is inferior, and adjustments of the heads are difficult.

SUMMARY OF THE INVENTION

The present invention has been made in order to eliminate the respective disadvantages of the two types described above, and has for its object to provide a head holding mechanism wherein a pair of heads are respectively mounted through gimbals in a manner to be movable relative to the surfaces of the medium or disk, thereby to reduce the load pressures of the heads and to attain a good follow-up property of the heads, and wherein the resonances of the gimbals are prevented, thereby to attain good rise characteristics of the outputs.

In one aspect of performance of the present invention, a head holding mechanism of a magnetic disk device in which a head is mounted by a leaf spring is characterized in that the leaf spring is embedded in a body of a vibration absorbing material.

BRIEF DESCRIPTION OF THE DRAWINGS

FIGS. 1(a) and 1(b) are schematic views each showing an example or a prior-art head holding mechanism, FIGS. 2 to 7 concern the head holding mechanism of a magnetic disk device according to the present invention, in which FIG. 8 is a graph showing the output waveforms of the heads in the case where a vibration absorber is not disposed, while

DESCRIPTION OF THE PREFERRED EMBODIMENT

Hereunder, an embodiment of the present invention will be described with reference to the drawings.

Figure 1A:
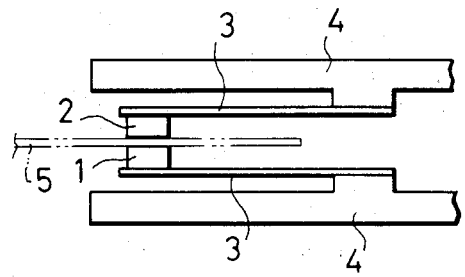
Figure 1B:
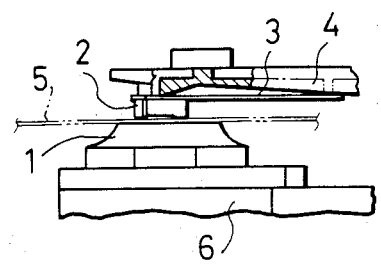
Figure 2:
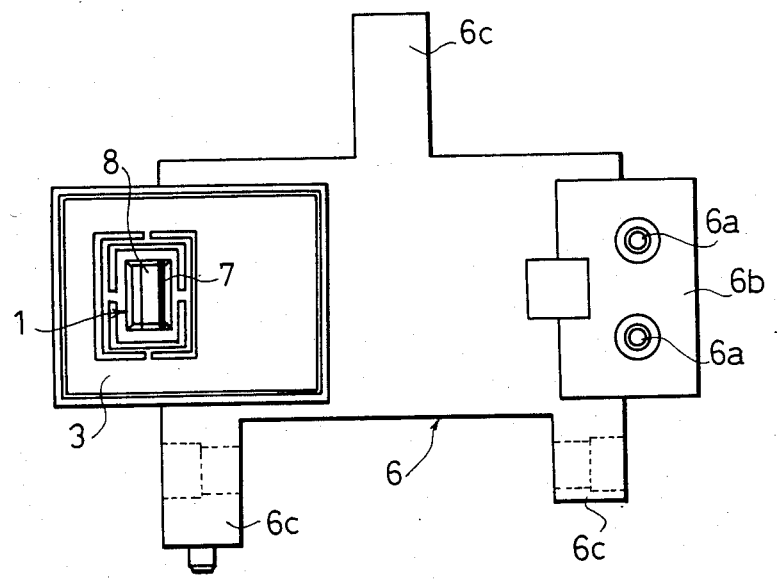
FIG. 2 is a top view of a mounting assembly of a first head.
Figure 3:
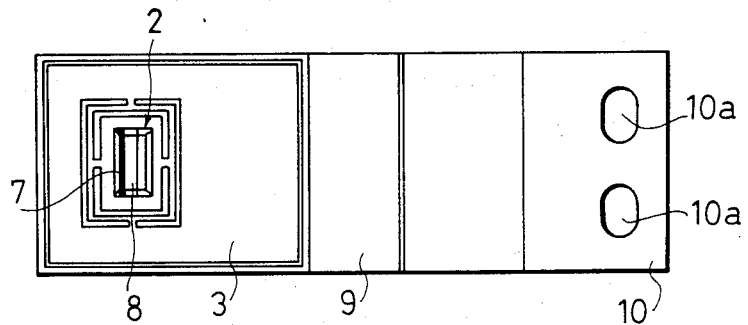
FIG. 3 is a bottom view of a mounting assembly of a second head.

FIG. 2 shows the mounting assembly of a first head 1 which is to be disposed on the rear surface of a medium such as a flexible magnetic recording disk 5, while FIG. 3 shows the mounting assembly of a second head 2 which is to be disposed on the front surface of the disk. Each of the first head 1 and the second head 2 is constructed of a core 7 which is made of a magentic material, and a slider 8 which is made of a nonmagnetic material. In FIG. 2, numeral 6 designtes a carriage which can drive the first head 1 toward the center of the disk 5 and to which a gimbal 3 with the first head 1 mounted thereon is fixed. Screw holes 6a are provided in a supporting portion 6b of the carriage 6. Arm portions 6c are provided in the carriage 6, and are slidably mounted on rails (not shown) of the magnetic disk device. In FIG. 3, numeral 9 designates a holding arm to which the second head 2 is attached through a gimbal 3. The arm 9 is fixed to a leaf spring 10 having holes 10a.

Figure 4:
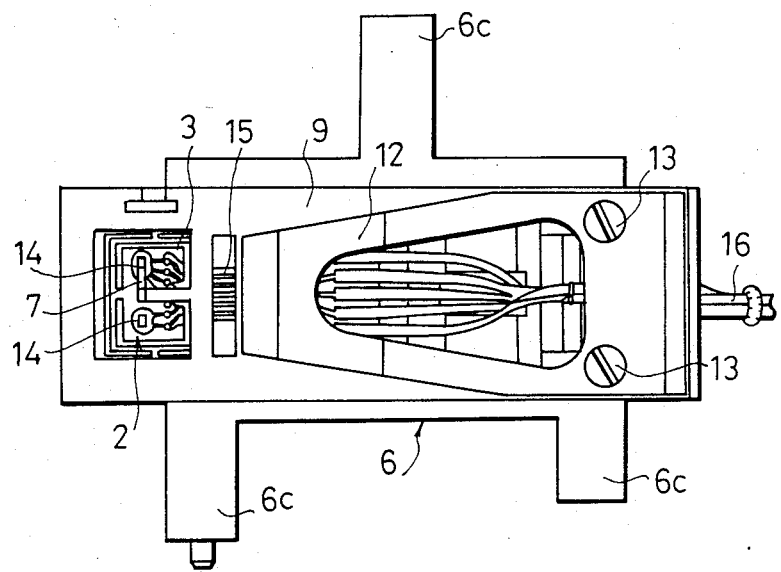
FIG. 4 is a top view of the head holding mechanism.
Figure 5:
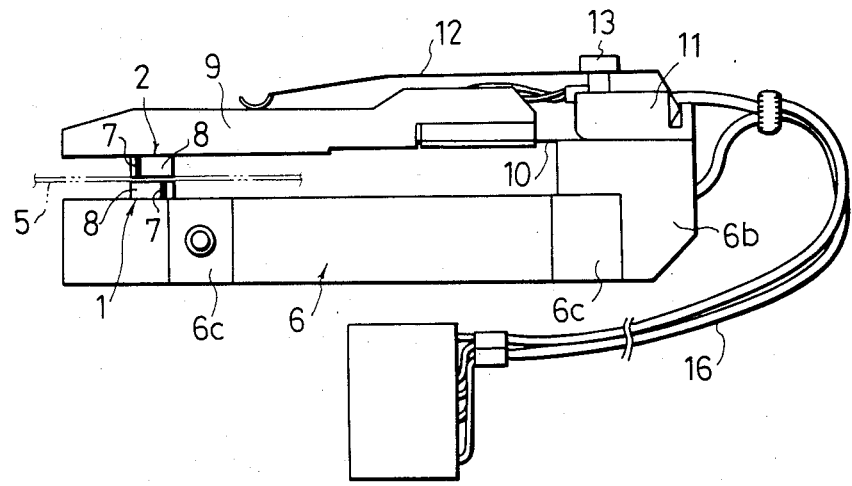
FIG. 5 is a front view thereof.
Figure 6:
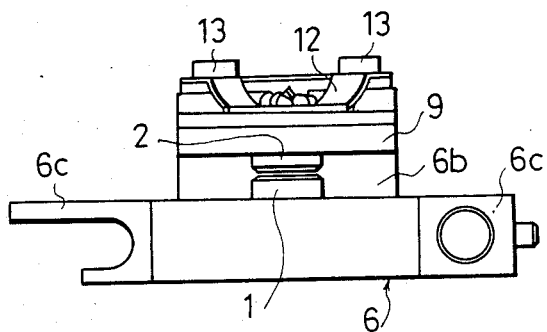
FIG. 6 is a side view thereof.

FIGS. 4 to 6 illustrate both mounting assemblies. The holding arm 9 is placed over the carriage 6 so that the first head 1 and the second head 2 may oppose each other. Screws 13 are passed in the holes 10a of the leaf spring 10 and engaged with the threaded holes 6a of the carriage 6 through a block member 11 as well as a load spring 12. The disk 5 can be inserted between the first and second heads 1 and 2, and these first and second heads 1 and 2 held in contact with the disk 5 under a predetermined pressure by the load pressure of the load spring 12. This load pressure can be finely adjusted by means of the screws 13. Coils 14 (refer also to FIG. 7) are wound round the cores 7. A flexible printed circuit board 15 serves to supply a recording signal to the coil 14 or to relay a reproduction signal. The circuit board 15 is connected to a connector 16 for connection with a control circuit board (not shown) of the magnetic disk device.

Figure 7:
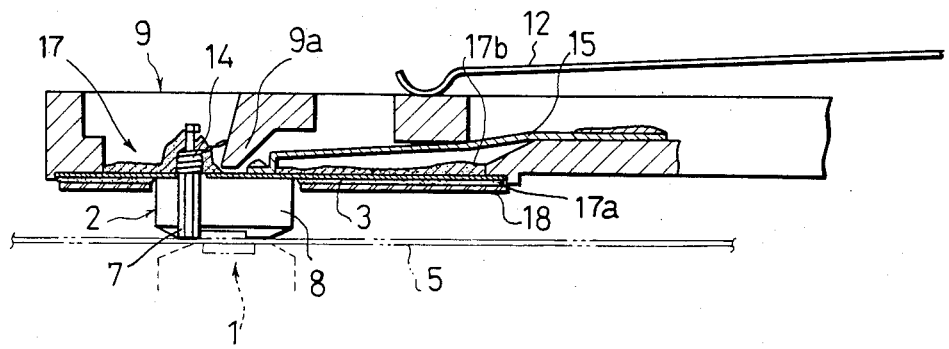
FIG. 7 is an enlarged sectional view of essential portions showing a mounting structure of the first head.

The structure in which the second head 2 is mounted on the holding arm 9 is shown in an enlarged scale by a sectional view of the essential portions in FIG. 7. The second head 2 is supported by the gimbal 3, and is exactly positioned and fixed in the frontward and rearward directions and rightward and leftward directions as viewed in the figure. Further, the upward movement of the second head 2 is regulated by a pin 9a which is provided unitarily with the arm 9. Here, in the present invention, the gimbal 3 is embedded within a body 17 of a vibration absorbent material so as to prevent the unnecessary resonance of the gimbal 3. The vibration absorbent material is preferably a paste of an elastomer of high stability, such as silicone rubber, and a fine powder additive such as SiO2 to improve dampening characteristics and reduce the weight. The paste is applied in a bottom layer 17a and a top layer 17b to the gimbal 3 such that when the material dries, an uneven layer (shown in section in FIG. 7 as an irregular top layer) is formed at least on one surface of the gimbal 3. A small quantity in most cases is sufficient, but the quantity can be increased or the areas of application varied to obtain desired dampening characteristics. The uneven layer may also be formed by spraying, brushing, and/or dropping and spreading the absorbent material on the gimbal 3 to an irregular thickness. The irregular layer may also be applied to portions of the head structure which are likely to be affected by resonances, such as to the coils 14 mounted on the gimbal 3. Numeral 18 indicates a cover sheet for preventing dust which is attached to the gimbal 3 by adhesion to the bottom vibration absorber layer.

The uneven layer of vibration absorbent material provides a diffust dampening characteristic which effectively dampens vibration over a wide range of vibration frequencies to eliminate any mechanical resonances, as compared to elastic dampening strips, loading springs, and rubber sheets disclosed in the prior art which tend to have ellective dampening characteristics over only certain frequencies. These types of conventional structures must also be attached separately in the assembly process, whereas the present invention requires only application by spraying, dropping, or spreading after the head structure is assembled, and the uneven layer is formed readily by such application.

Although not illustrated, it is a matter of course that the vibration absorber 17 is also stuck to the gimbal 3 with the first head 1 mounted thereon so as to prevent the unnecessary resonance of the gimbal 3.

Owing to the construction described above, the vibrations of the gimbals 3 from the contacts between the first and second heads 1 and 2 and the disk 5 nd the vibrations thereof due to the warp of the disk 5 are absorbed by the vibration absorbers 17. Thus, it is possible to provide a head holding mechanism which exhibits a good damping and whose output rise characteristics are better than in the type with one side fixed. Further, since both the heads 1 and 2 are movable, their load pressures can be made small, and their property of following any warp of the disk 5 is good.

Figure 8:
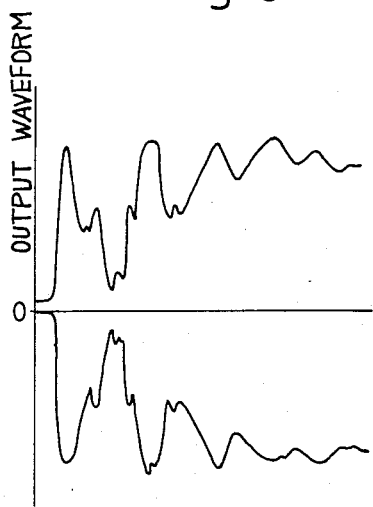
Figure 9:
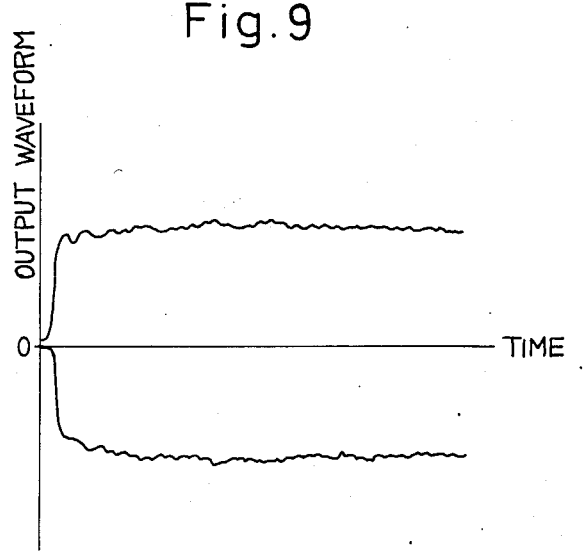
FIG. 9 is a graph showing the output waveforms of the heads in the case where vibration absorbers are disposed.

Referring now to FIGS. 8 and 9, description will be made of characteristics in the case where the gimbals 3 are provided with the vibration absorbers 17 and in the case when they are not.

both the figures illustrate the outputs of the heads at the moment at which the heads come into contact with the disk, the measurement of such outputs being usually called a "tap test" (the axis of the ordinates represents the outputs, while the axes of abscissas represents time). FIG. 8 shows the outputs of the heads in the case where neither of the vibration absorbers 17 is disposed. As apparent from the figure, the outputs of the heads involve considerable fluctuations. Such fluctuations of the outputs of the heads are attributed to the fact that as the heads come into contact with the disk or other medium, they are repulsed to jump up at the next moment, and that they land again on the disk, this bouncing action being repeated. On the other hand, FIG. 9 corresponds to the case where the vibration absorbers 17 are disposed. As apparent from the figure, the period of time in which the outputs of the heads become stable is very short. This is because the resonances of the gimbals 3 are suppressed.

As set forth above, the present invention consists in that leaf springs (gimbals) with first and second heads mounted thereon are embedded with vibration absorbers applied thereon. Therefore, those resonances of the gimbals which occur at the contacts between the first and second heads and a medium or due to the warp of the medium are absorbed by the vibration absorbers, and a magnetic disk device of good damping and good output rise characteristics can be provided. It also becomes possible to conveniently apply the absorbent material on a narrow gimbal and to reduce the dimensions thereof as compared to conventional dampening structures. The dampening characteristic of the uneven layer ensures elimination of mechanical resonances in the heads. Moreover, since both the heads are movable relative to the medium plane, their load pressures can be made small and thjeir property of following the wrap of the medium is good, so that the medium is not damaged. The present invention has such remarkable effects.

What is claimed is:

1. In a head holding mechanism for a magnetic disk device having at least one magnetic head adapted to engage a surface of a magnetic disk, a frame, a gimbal mounted on said frame, and said magnetic head mounted on said gimbal, the improvement comprising an uneven layer of a vibration absorbent material applied to at least one surface of said gimbal so as to provide a diffuse dampening characteristic over a wide range of vibration frequencies.

2. A head holding mechanism of a magnetic disk device as defined in claim 1, wherein said vibration absorbent material is a paste absorbent material is formed form silicone rubber doped with a fine powder of $SiO_2$.

3. A head holding mechanism of a magnetic disk device as defined in claim 1, wherein a respective cover sheet is secured to each said gimbal for preventing the entry of dust.

4. The head holding mechanism of claim 1, further comprising a second magnetic head, opposed to the one magnetic head, which is mounted on a second gimbal haivng an uneven layer of vibration absorbent material applied to at least one surface thereof.

5. The heat holding mechanism of claim 1, wherein said uneven layer is formed on an upper surface of said gimbal from a paste of vibration absorbent material.

6. The head holding mechanism of claim 1, wherein said uneven layer includes a portion applied to a coil structure forming a part of said magnetic head.

7. The head holding mechanism of claim 1, wherein a further layer of vibration absorbent mateial is formed on a lower surface of said gimbal so as to embed said gimbal between the two layers.

* * * * *